United States Patent [19]
Jordan

[11] Patent Number: 5,347,779
[45] Date of Patent: Sep. 20, 1994

[54] HIGH-RISE BUILDING

[75] Inventor: Paul Jordan, Konstanz, Fed. Rep. of Germany

[73] Assignee: RLS-Bautechnologie-AG, St. Gallen, Switzerland

[21] Appl. No.: 728,256

[22] Filed: Jul. 11, 1991

[30] Foreign Application Priority Data

Jul. 14, 1990 [DE] Fed. Rep. of Germany ....... 4022441

[51] Int. Cl.5 ............................................. E04F 17/04
[52] U.S. Cl. .................... 52/302.3; 52/235; 454/250; 454/333
[58] Field of Search ............... 52/303, 305, 302, 304, 52/235, 302.1, 302.3, 302.7; 454/250, 252, 270, 271, 333, 334

[56] References Cited

U.S. PATENT DOCUMENTS

| | | | |
|---|---|---|---|
| 3,343,474 | 9/1967 | Sohoa et al. | 52/303 |
| 3,415,024 | 12/1968 | Kotlarz | 52/235 |
| 4,286,420 | 9/1981 | Pharmakidis | 52/302.3 |
| 4,295,415 | 10/1981 | Schneider, Jr. | 52/303 |
| 4,947,593 | 8/1990 | Kuo | 52/302 |

FOREIGN PATENT DOCUMENTS

| | | |
|---|---|---|
| 0090794 | 9/1987 | European Pat. Off. . |
| 2049724 | 6/1972 | Fed. Rep. of Germany ........ 52/303 |
| 3508876 | 9/1986 | Fed. Rep. of Germany . |

*Primary Examiner*—Michael Safavi
*Attorney, Agent, or Firm*—Collard & Roe

[57] ABSTRACT

A high-rise building comprises an exterior wall and a sheath, which is spaced in front of said wall. Vertically extending flow channels are provided between said wall and said sheath and are open at their bottom and top and may be used to supply air to and from the interior of said building and to air-condition the interior of said building. To permit an effective control of the conditions of the ambient air adjoining said sheath, each of said flow passages communicates with the ambient air adjoining said sheath through a plurality of vertically spaced apart intake openings distributed throughout the height of said sheath.

9 Claims, 4 Drawing Sheets

HIGH-RISE BUILDING

BACKGROUND OF THE INVENTION

1. Field of the Invention

This invention relates to a high-rise building comprising an exterior wall and a sheath, which is spaced in front of the exterior wall and defines vertically extending passages, which have inlet and outlet openings at their bottom and top ends and may be used to supply and withdraw air to and from the interior of the building and to air-condition the building.

2. Description of the Prior Art

EP-B1-0 090 794 discloses a building having an exterior wall and an exterior sheath, which is spaced in front of the exterior wall, and the space between the sheath and the exterior wall constitutes an air supply passage, which contains valve means for selectively opening and closing said air supply passage. To permit even adjacent to the window and door openings an adaptation of the heat insulation of the exterior wall to outdoor conditions as regards temperature and solar radiation, said valves serve also as shading means for the windows.

Published German Application 20 49 724 shows a cooling and ventilating system for buildings in which the exterior wall and the roof consist of double panels, by which air spaces are defined. An opening leading to the air spaces is provided adjacent to the ridge of the roof and is covered by a lantern-type roof light, and dampers are provided in the lower region so that the air being heated in the summer will rise between the double panels and will suck cool air to follow up and the interior wall facing the dwelling room will thus be kept cool. Hot air can be supplied to said air spaces in the winter. The air flow can be controlled by the dampers, which are provided at the lower portion of the double panels, and by an adjustment of the lantern-type roof light.

In Published German Application 35 08 876 it is proposed to permit a uniform air-conditioning of rooms and a compensation of solar irradiation in a building in that the latter is provided on at least one side facing the sun with means for absorbing solar heat and the heat which has been absorbed is transferred to that side of the building which faces away from the sun. Such an arrangement is intended to utilize an existing heat potential, particularly in moderate climates.

In high-rise or very-high-rise buildings, particularly in subtropical or tropical regions and in regions in which the insolation duration is very long, it has been found that the sheath of the building will be heated up and, as a result, the ambient air adjoining the exterior sheath of the building will also be heated unless means are provided for shading the exterior sheath of the building from the outside. Otherwise there will be a rise of the air close to the building and such rising air will be able to entrain air from the lower regions of the building and the pollutants, such as dust and gases, contained therein so that such pollutants will be carried to those regions of the building in which windows or suction fans are provided for a supply of air to interior rooms. As a result, it is not possible to provide for a natural ventilation, e.g., through an open window, and this will be particularly disadvantageous if the building has not been provided with an air-conditioning system because the latter would have secondary effects which are deleterious to health and because such system would have a high power consumption.

SUMMARY OF THE INVENTION

It is an object of the invention to destroy the rolling bodies of air which are formed on the outside of high-rise and very-high-rise buildings by the air which rises on the outside surface of the sheath of the building and to permit a natural ventilation of the interior of the building.

It is another object of the invention to permit an effective utilization of the flow of air rising in the flow passages.

Said objects are accomplished in accordance with the invention in that the flow passages are provided with vertically spaced apart intake openings, which are accessible to the outdoor air.

Desirable further features of the invention will be recited in the dependent claims.

Because vertically spaced apart intake openings are provided and a stream of air rises in the flow passages behind said intake openings, air which would otherwise rise on the outside of the sheath of the building will be sucked from the outside into the passages in all elevation ranges of the building. With an increase of the temperature rise of the sheath of the building, the air will rise in the flow passages at a higher velocity so that the suction force acting through the intake openings on the ambient air will also be increased. As a result, the formation of a rising body of rolling air on the outside surface of the sheath of the building will be opposed and the provision of a plurality of intake openings spaced apart in the direction of flow will ensure that the resulting thermosiphon action produced within the passages by the self-controlling admission of air from the outside will be maintained regardless of the elevation and the air will continue to rise in the passages. The air on the outside of the building is heated by the sheath of the building, which sheath has been heated by solar irradiation, and that effect can be utilized in two ways in that the formation of a rolling body of air on the outside surface of the sheath of the building will be opposed and the energy content of the rising air can be utilized for various purposes, e.g., for a supply and withdrawal of air to and from the interior rooms of the building. The structural design of the sheath of the building will not be significant for that effect and that sheath may be interrupted or may be composed of separate passage-defining elements. It may consist of light-transmitting and/or of opaque wall portions. It will merely be required that the sheath of the building defines the flow passages and the multiplicity of intake openings. The design of the means which define the passages and the design of the intake openings can freely be selected within a large range and may be adapted to the existing conditions. For instance, the passages may be defined by suitable pioing or by partitions in intermediate spaces and the intake openings may consist of simple gaps or slots or may be constituted by special intake means, which may be provided with control valves.

The flow passages may contain means for treating the rising air which is supplied or withdrawn to and from the flow passages. For instance, that air may be filtered or dehumidified or may be fed to heat recovery plant, as may particularly be desirable with high-rise buildings during an insolation in the winter. The flow passages may be provided with a powerproducing plant, such as a roll-like turbine, so that the flow energy can be utilized, e.g., to produce electric power. Besides, the rising warm air can be supplied to cooler zones. For instance, the air may be conducted from the southern side of a high-rise building to the northern side thereof so that the air may be automatically dehumidified there.

A very important effect can be seen in that the natural draft in the flow passages is utilized to suck spent air out of the building. To that end it is possible to provide, e.g., the window compartments with suitable intake openings, which can be valve-controlled and communicate with the flow passages. The follow-up air entering the interior of the building is suitably sucked from regions which contain high-quality air, e.g., through a common intake passage in the upper region of the building. If the natural draft in the flow passages is utilized to suck unsatisfactory air from the rooms, it will be possible within the scope of the invention to purify and to properly treat that spent air adjacent to the outlets of the passages so that the treated air may be recycled to the interior of the building as fresh air and an ecologically satisfactory circulation of air may thus be produced.

Because the formation of a rolling body of rising air on the outside of the building is opposed and the highly polluted ambient air is exhausted through the flow passages, the air which adjoins the outside of the sheath of the building will be unpolluted and a natural admission of air through opened windows will be possible.

The humidity of the air which rises in the flow passages can be utilized to produce an aqueous condensate, which may be used to humidify growing plants. That condensate may desirably be collected in a pool, which surrounds the building, so that the condensate will be evaporated by solar radiation and will thus promote the draft in the flow passages.

If the flow passages communicate with each other through valve-controlled transverse passages, it will be possible to distribute the rising air over the entire outside surface of the building and to provide desired draft and temperature conditions also on those sides of the buildings which face away from the sun. In that case the strong draft on the sunside of the building may be utilized on the shaded sides of the building and may be used there too to produce the desired thermosiphon action.

The rising flow passages extend beside the windows so that dead spaces will be provided adjacent to the windows and may be subjected to a very high temperature rise. In order to provide for a suitable ventilation in such regions, such compartments defined by partitions may communicate through transfer passages with the adjacent flow passages so that the desired withdrawal of air will be ensured. The transfer passages may obviously be constituted by simple transfer openings in the partitions and may open into the flow passages above the window compartments so that a forcing of low-quality air from the flow passages into the window compartments can be prevented in a simple manner.

In order to increase the draft and the thermosiphon action the flow passages may be defined by means which comprise materials which will exhibit a temperature rise in response to solar radiation. The flow passage may incorporate solar collectors or other energy recovery plants and the energy which has thus been recovered can immediately be utilized for air conditioning or for a control of the draft in the flow passages and a high economy in operation will thus be ensured.

DETAILED DESCRIPTION OF THE PREFERRED EMBODIMENT

A high-rise building embodying the invention will now be described more in detail with reference to the schematic drawing.

Figure 1:
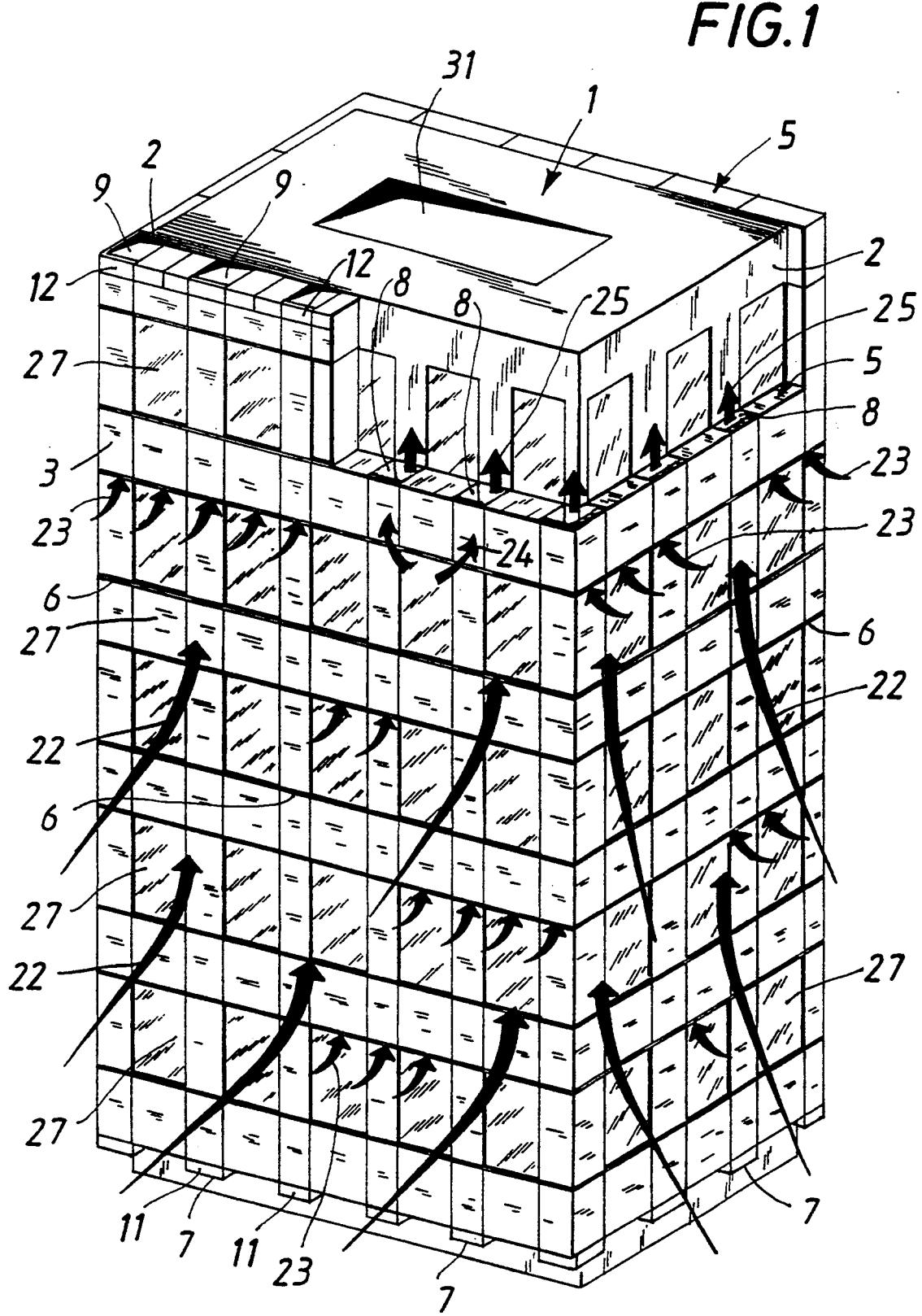
FIG. 1 is a perspective view of a high-rise building in accordance with the invention.
Figure 2:
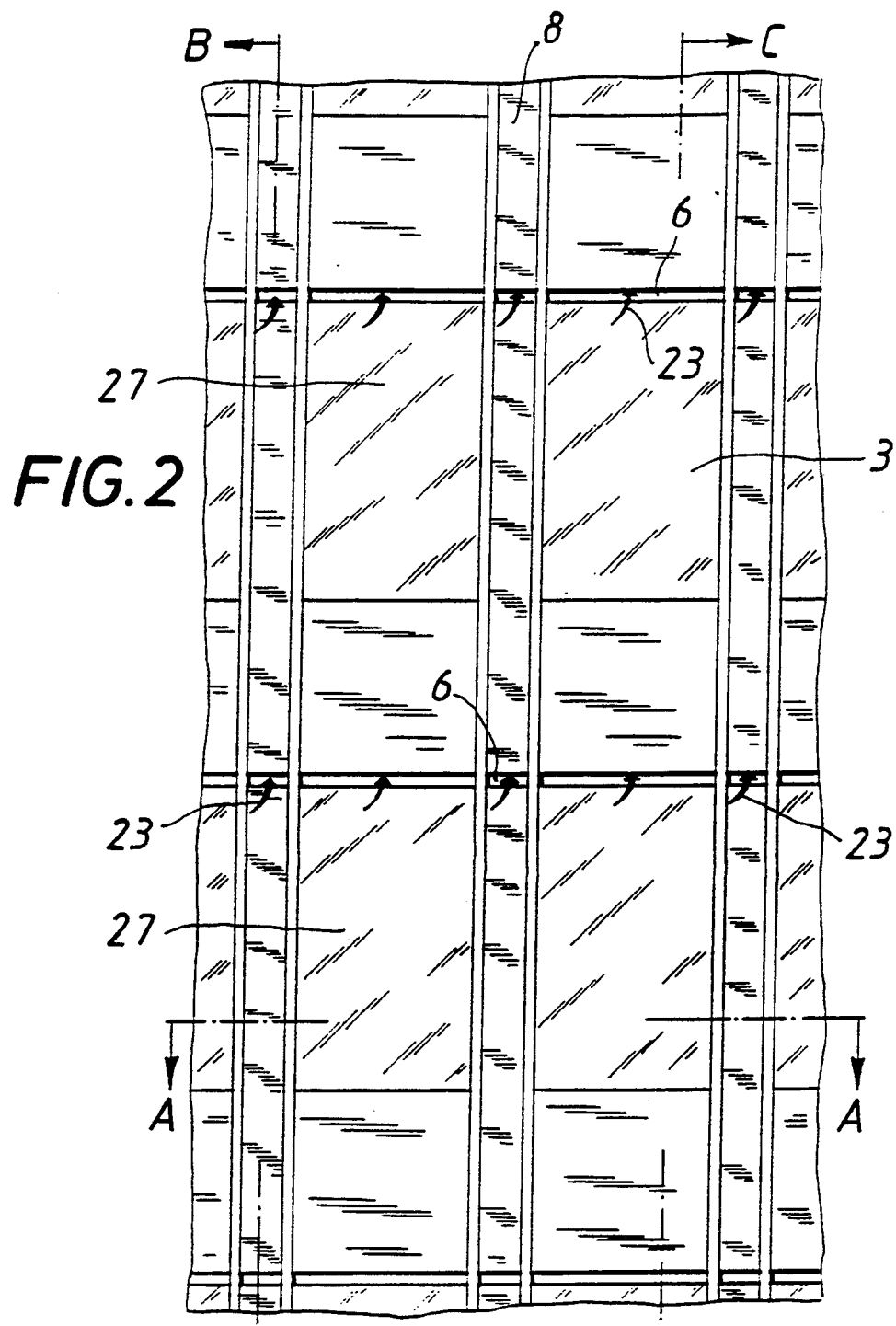
FIG. 2 is a fragmentary front elevation showing a portion of that building.
Figure 3:
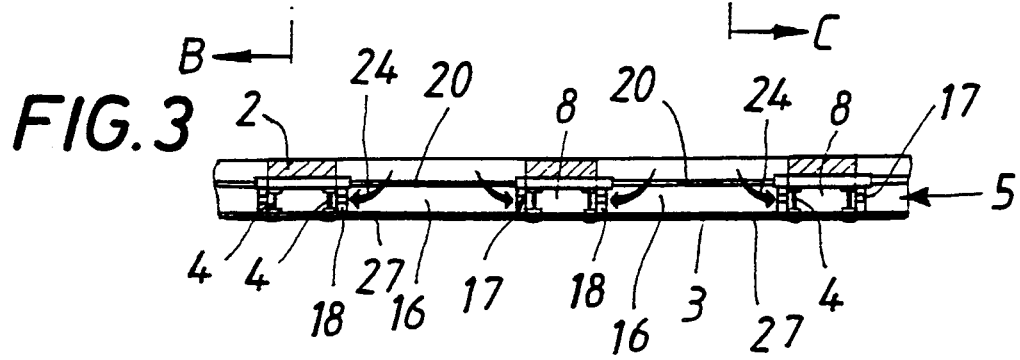
FIGS. 3 to 5 are sectional views taken on lines A—A, B—B, and C—C, respectively, in FIG. 2.
Figure 4:
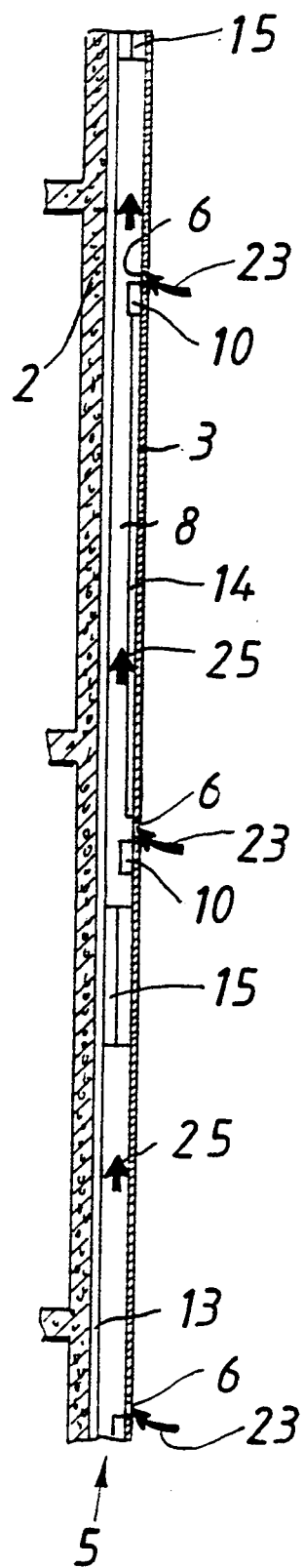
Figure 5:
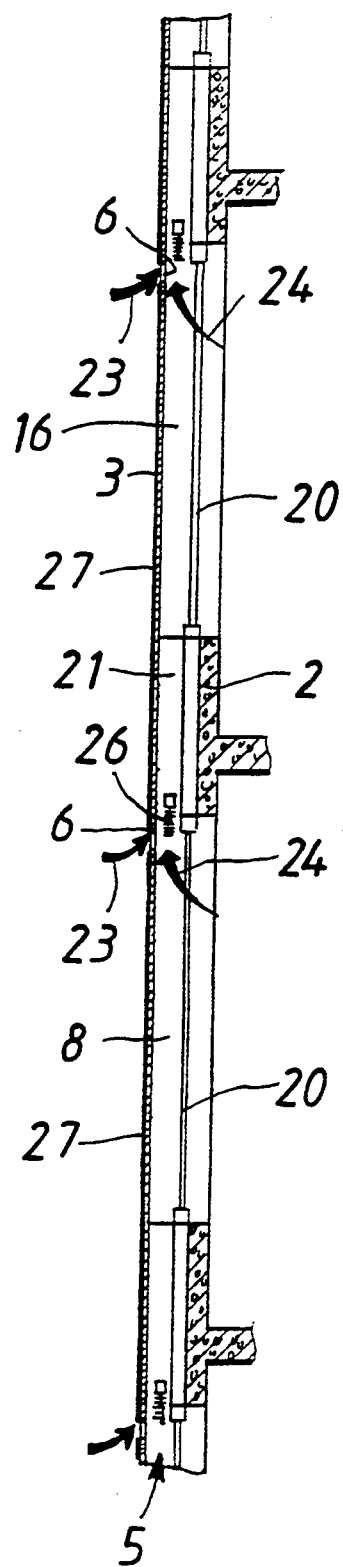

As is indicated in FIG. 1 a high-rise building 1 comprises an exterior wall 2 and a sheath 3, which is spaced in front of the wall 2 and defines with the outside surface of the wall 2 a ventilating space 5, which is divided by vertical partitions 4 into vertical flow passages 8, which extend between vertical rows of windows. The flow passages 8 communicate with the air on the outside of the building through inlet openings 7 at the lower ends of the passages 8 and through outlet openings 9 at the top end of the passages and through vertically spaced apart intake openings 6, which may consist, e.g., of slots in the sheath 3 and are preferably provided with control valves 10 for changing the flow area of the intake openings 6. The air flowing into the flow passages 6 may be treated adjacent to the inlet openings 7 and/or the outlet openings 9 by filtering, dehumidifying and/or temperature control means, and the flow energy may be utilized by the provision of energy recovering means 12, such as roll-like turbines, adjacent to the exit openings 9.

The temperature rise of the sheath 3 of the building causes the ambient air adjoining the sheath and in the flow passages 8 to rise, as is indicated by the arrows 22 and 25, respectively. Because ambient air is sucked into the passages 8, as is indicated by arrows 23, through the vertically spaced apart intake openings 6 distributed throughout the height of the building, the draft in the flow passages 8 (arrows 25) is maintained and is even increased by the continual intake of air and the sucking of air adjoining the building will restrain a rising of polluted air on the outside of the sheath 3. As a result, the rise of a rolling body of air on the outside of the building will be opposed and the air that has been sucked into the flow passages 8 can be purified and air-conditioned and its energy content can be utilized.

As is illustrated more in detail in FIGS. 2 to 5, the sheath 3 consisting, e.g., of a glass facade, is spaced in front of the exterior wall 2 of the building, and the ledges 4 which retain the facade also constitute partitions, which divide the space 5 into several flow passages 8. The exterior wall 2 may be covered with heat insulation 13 and may be provided on the outside with means 14 for utilizing solar energy. Such means may consist of layers of materials which will exhibit a temperature rise when exposed to insolation or of solar collectors or photovoltaic systems. It will also be desirable to install means 15, such as fans or dampers, for controlling the air flow in the flow passages 8.

It may be desirable to utilize the air flow in the flow passages 8 for a supply and withdrawal of air to and from the interior of the building. This may be accomplished by the provision of intake openings 17 between certain flow passages 8 and the enclosed window compartments 16 between an inner window 20 in the exterior wall 2 and an outer window 27 in the sheath 3 so that suitable sliding valves or other shut-off valves 18 can be opened to permit air to be sucked from the interior of the building through the windows 20 into the flow passages 8, as is indicated by the arrows 24. Pure air can be supplied from above to the interior of the building through an intake shaft 31. Various means, such as louver blinds 26, may be provided for shading the window compartments whereas they do not interfere with the withdrawal of air.

Figure 6:
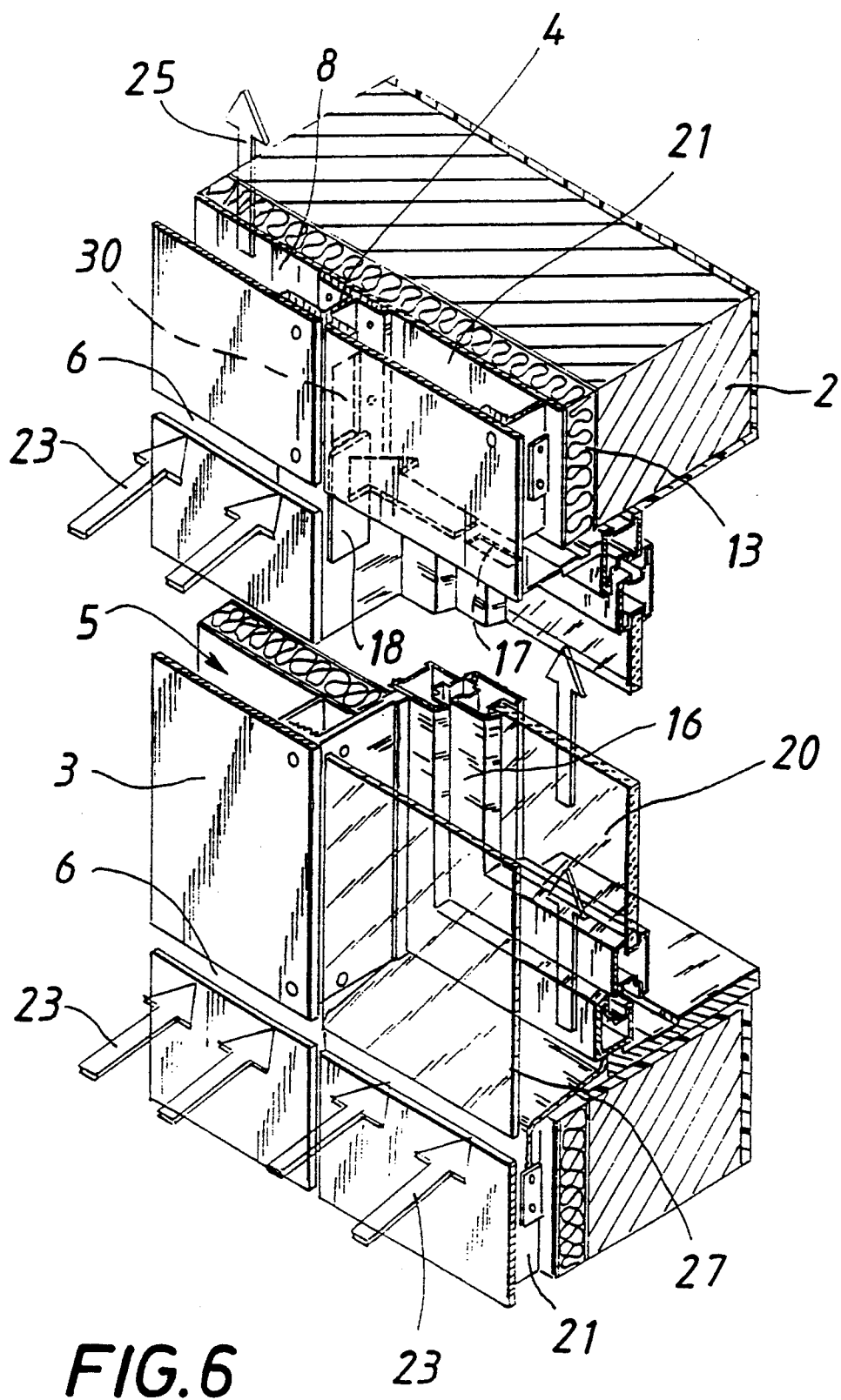
FIG. 6 is a fragmentary perspective view showing a wall portion of the building.

As is apparent from FIG. 6 the window compartments 16 are separated by partitions not only from the laterally adjacent flow passages 8 but also from the adjacent other window compartments so that the window compartments will not undesirably influence each other. To permit a ventilation of the regions 21 between vertically spaced apart window compartments 16 and to avoid an excessive build-up of heat on those regions, said intermediate compartments 21 above and below the window compartments 16 communicate through transfer openings 30 with the adjacent flow passages 8 so that a suitable air conditioning can be expected throughout the outside surface of the building.

The transfer openings 30 may be arranged to establish a communication between adjacent flow passages 8 through the intermediate compartments 21 and if the control valves 15 provided in the flow passages 8 are properly controlled it will then be possible to divert the vertical flow at least in part to a horizontal flow so that the flow conditions on the shade side of the building can also be influenced by the thermosiphon action on the sunside and an equalization of temperature can be achieved.

I claim:

1. In a high-rise building comprising
   an exterior wall defining an interior space in said building,
   an exterior sheath spaced in front of said wall, and
   means defining between said wall and said sheath a plurality of vertically extending, juxtaposed flow passages, each of said flow passages having a lower end and an upper end, which ends communicate with the ambient air outside said building through inlet openings adjacent to the lower ends of said passages and through outlet openings adjacent to the upper ends of said passages,
   the improvement comprising
   a plurality of vertically spaced intake openings distributed throughout the height of said sheath and leading to said flow passages whereby the ambient air adjoining said sheath communicates with said flow passages, and
   valve-controlled transverse flow passages connecting adjacent ones of said vertically extending flow passages.

2. In a high-rise building comprising
   an exterior wall defining an interior space in said building,
   an exterior sheath spaced in front of said wall, and
   means defining between said wall and said sheath a plurality of vertically extending, juxtaposed flow passages, each of said flow passages having a lower end and an upper end, which ends communicate with the ambient air outside said building through inlet openings adjacent to the lower ends of said passages and through outlet openings adjacent to the upper ends of said passages,
   the improvement comprising
   a plurality of vertically spaced intake openings distributed throughout the height of said sheath and leading to said flow passages whereby the ambient air adjoining said sheath communicates with said flow passages,
   box-like partitioning means between said exterior wall and said sheath, said partitioning means defining window compartments between said exterior wall and said sheath,
   said vertically extending flow passages comprising flow passages adjacent to said window compartments, and
   said box-like partitioning means defining transfer passages through which said window compartments communicate with said adjacent vertically extending flow passages.

3. The improvement set forth in claim 2, wherein said transfer passages open into said adjacent flow passages above said window compartments.

4. The improvement set forth in claim 2, wherein said transfer passages open into said adjacent flow passages below said window compartments.

5. In a high-rise building comprising
   an exterior wall defining an interior space in said building,
   an exterior sheath spaced in front of said wall, and
   means defining between said wall and said sheath a plurality of vertically extending, juxtaposed flow passages, each of said flow passages having a lower end and an upper end, which ends communicate with the ambient air outside said building through inlet openings adjacent to the lower ends of said passages and through outlet openings adjacent to the upper ends of said passages,
   the improvement comprising
   a plurality of vertically spaced intake openings distributed throughout the height of said sheath and leading to said flow passages whereby the ambient air adjoining said sheath communicates with said flow passages, and
   throttle valves installed in said flow passages for throttling the flow of air therethrough.

6. In a high-rise building comprising
   an exterior wall defining an interior space in said building,
   an exterior sheath spaced in front of said wall, and
   means defining between said wall and said sheath a plurality of vertically extending, juxtaposed flow passages, each of said flow passages having a lower end and an upper end, which ends communicate with the ambient air outside said building through inlet openings adjacent to the lower ends of said passages and through outlet openings adjacent to the upper ends of said passages,
   the improvement comprising
   a plurality of vertically spaced intake openings distributed throughout the height of said sheath and leading to said flow passages whereby the ambient air adjoining said sheath communicates with said flow passages, and
   each of said flow passages communicating with said interior space through at least one valve-controlled passage.

7. In a high-rise building comprising an exterior wall defining an interior space in said building, an exterior sheath spaced in front of said wall, and means defining between said wall and said sheath a plurality of vertically extending, juxtaposed flow passages, each of said flow passages having a lower end and an upper end, which ends communicate with the ambient air outside said building through inlet openings adjacent to the lower ends of said passages and through outlet openings adjacent to the upper ends of said passages, the improvement comprising a plurality of vertically spaced intake openings distributed throughout the height of said sheath and leading to said flow passages whereby the ambient air adjoining said sheath communicates with said flow passages, and means for utilizing the flow energy of the air flowing in said flow passages.

8. The improvement set forth in claim 7, wherein said utilizing means comprise roll-like turbines.

9. In a high-rise building comprising an exterior wall defining an interior space in said building, an exterior sheath spaced in front of said wall, and means defining between said wall and said sheath a plurality of vertically extending, juxtaposed flow passages, each of said flow passages having a lower end and an upper end, which ends communicate with the ambient air outside said building through inlet openings adjacent to the lower ends of said passages and through outlet openings adjacent to the upper ends of said passages, the improvement comprising a plurality of vertically spaced intake openings distributed throughout the height of said sheath and leading to said flow passages whereby the ambient air adjoining said sheath communicates with said flow passages, said flow passages communicating with said interior space and being adapted to withdraw air from said interior space, and means for withdrawing air from said interior space, for conditioning the air which has thus been withdrawn and for delivering the thus conditioned air to said flow passages.

* * * * *